United States Patent
Thelen

[15] 3,702,921
[45] Nov. 14, 1972

[54] PRECISION TEMPERATURE CONTROL CIRCUIT WITH IMPROVED RELIABILITY

[72] Inventor: William Thelen, Glen Ellyn, Ill.

[73] Assignee: Bell Telephone Laboratories, Incorporated, Murray Hill, Berkeley Heights, N.J.

[22] Filed: Sept. 1, 1971

[21] Appl. No.: 176,827

[52] U.S. Cl. .................. 219/501, 219/497, 219/499
[51] Int. Cl. ............................................. H05b 1/02
[58] Field of Search ............... 219/497, 499, 501, 505

[56] References Cited

UNITED STATES PATENTS 3,586,829   6/1971   Farmer et al. .............. 219/497
2,994,759   8/1961   Lipman ...................... 219/501

Primary Examiner—Bernard A. Gilheany
Assistant Examiner—F. E. Bell
Attorney—R. J. Guenther et al.

[57] ABSTRACT

An oven temperature control circuit includes a four-terminal resistance bridge having a thermistor in one of its arms and a voltage source across one of its diagonals, a transistor differential amplifier with input terminals connected across the other bridge diagonal, an astable transistor multivibrator having its timing controlled from the output terminals of the differential amplifier, a heating element, and a heating current supply transistor having its base-emitter path controlled by an output side of the multivibrator and its emitter-collector path connected to supply current to the heating element from a heating power source. Any departure of the thermistor resistance from a predetermined normal value is detected by the bridge and control currents developed by the differential amplifier are used to vary the duty cycle of the output side of the multivibrator. The heating current supply transistor is switched between the nonconducting and saturated states and its duty cycle varied along with that of the output side of the multivibrator, thereby supplying power to the heating element without substantial dissipation in the heating current supply transistor.

4 Claims, 3 Drawing Figures

PATENTED NOV 14 1972 3,702,921

PRECISION TEMPERATURE CONTROL CIRCUIT WITH IMPROVED RELIABILITY

BACKGROUND OF THE INVENTION

This invention relates generally to oven temperature control circuits and more particularly to electronic temperature control circuits with exceptionally high requirements for reliability and precision.

In large electronic communication systems such as high capacity telephone switching and multiplex transmission systems, it is often important that some components with operating characteristics particularly critical important timing, frequency, phase, or signal amplitude relationships be maintained at as nearly a constant temperature as possible. Under such circumstances, the critical components are typically housed in an oven and control circuitry is provided to keep the oven temperature substantially unvarying. In the control circuitry, a premium is placed not only upon accuracy, which is needed to minimize oven temperature variations, but also reliability, which is important in order to avoid any frequent necessity for taking the entire communication system out of service or permitting it to operate at a reduced performance level while temperature control circuit components are being replaced.

Although many oven temperature control circuits found in the prior art provide a high degree of precision in temperature control, they tend not to have the desired extremely high degree of reliability. Control circuits using bimetallic or mercury sensing elements rely upon the opening and closing of mechanical contacts for their operation and such contacts have a tendency to fail after prolonged use. Electronic circuits using thermistor bridge detectors to sense temperature variations and amplifying devices to control the flow of heating currents avoid the particular problems associated with mechanical contacts but still tend to have reliability problems caused by failure of the electronic amplifying devices supplying current to the oven heaters. Vacuum tubes have limited useful lifetimes because of such factors as heater burnout and cathode deterioration, and transistors tend to fail because of excessive power dissipation within their own emitter-collector paths.

A principal object of the invention is to improve the reliability of the type of electronic temperature control circuit using one or more transistors to control the flow of heating current without sacrifice of precision.

Another and more particular object is to reduce the power dissipation in the heating current supply transistors in an electronic temperature control circuit without sacrifice of precision.

SUMMARY OF THE INVENTION

In a temperature control circuit in accordance with the invention, departures of temperature from a predetermined normal value are detected, the heating current supply transistor or transistors are switched between substantially nonconducting and substantially saturated states, and the duty cycle of the heating current supply transistor or transistors is varied under the control of any detected departures in order to provide the required heating corrections. Power dissipation in the emitter-collector paths of the heating current supply transistors is drastically reduced and reliability increased because practically no current flows while the transistors are in their nonconducting state and the amount of series resistance is quite low while they are in their saturated state. The present invention thus reduces power dissipation in the heating current supply transistors of an electronic temperature control circuit in a manner somewhat reminiscent of that employed by a voltage regulator of the so-called switching type to improve regulator efficiency, with the important difference that the temperature control circuit, in compensating for such changes as shifts in ambient temperature, functions to provide an electrical output which is essentially varying while a voltage regulator functions to maintain an electrical output which is substantially constant.

An important embodiment of the invention takes the form of a temperature control circuit which includes a four-terminal resistance bridge having a thermistor in one of its arms and a voltage source across one of its diagonals, a differential amplifier having input terminals connected to opposite ends of the other bridge diagonal, an astable or free-running multivibrator having its timing controlled from the differential amplifier output terminals, and at least one transistor having its base-emitter path coupled to an output side of the multivibrator and its emitter-collector path connected to supply current to a heating element from a heating power source. In this embodiment, the active bridge detects any departure of the thermistor resistance from a predetermined normal value and translates it into a potential difference across the output diagonal. The differential amplifier supplies current to and from the multivibrator which varies the duty cycle of the output side of the multivibrator and the multivibrator output switches the emitter-collector path of the heating current supply transistor between substantially nonconducting and substantially saturated states, thereby supplying power to the heating element and controlling the heat generated without substantial dissipation in the heating current supply transistor itself and with no sacrifice of precision. Both the bridge thermistor and the heating element are, in practice, typically placed within the oven the temperature control circuit is designed to control. Significant additional benefits realized include a very low noise sensitivity at extreme duty cycles because of the substantially linear multivibrator timing current discharge afforded by the differential amplifier.

A more complete understanding of the invention and its features may be obtained from a study of the following detailed description of a specific embodiment and the accompanying drawing.

DETAILED DESCRIPTION

Figure 1:
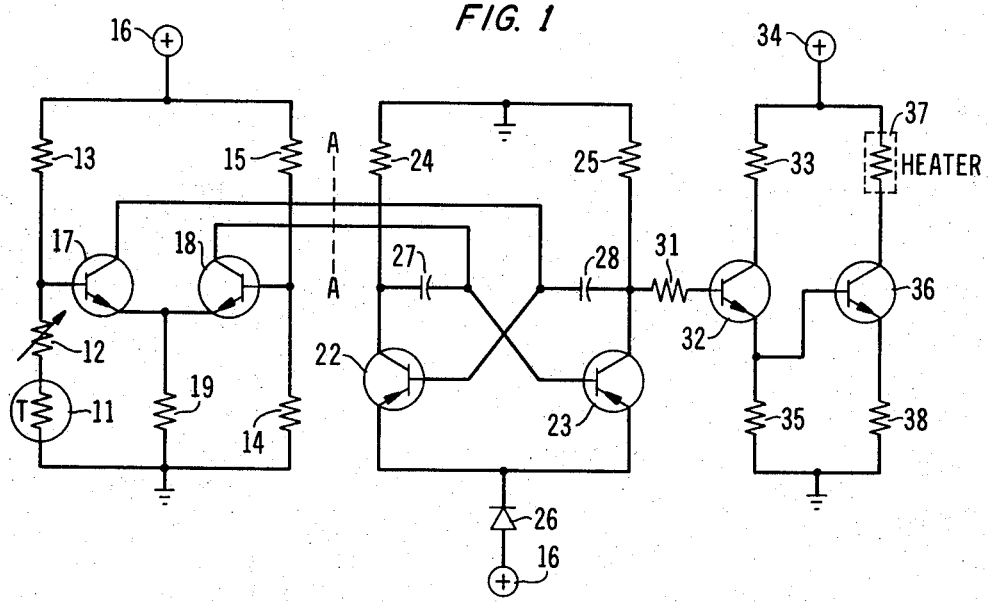
FIG. 1 is a schematic diagram of a specific embodiment of the invention using an active bridge, a differential amplifier, and an astable multivibrator to switch the heating current supply transistors.

In the embodiment of the invention illustrated in FIG. 1, a thermistor 11 is connected in a four-terminal bridge configuration with four resistors 12, 13, 14, and 15. As shown, thermistor 11 is connected in series with resistor 12 in one arm of the bridge, each of the remaining resistors forms one of the remaining arms, and a d-c voltage source 16 is connected across one of the bridge diagonals. In detail, thermistor 11 and resistors 12 and 13 form one series path and resistors 14 and 15 form another between the positive side of source 16 and ground. Resistors 13, 14, and 15 all have substantially the same resistance, for example, and that resistance is substantially the same as the series resistance of resistor 12 and thermistor 11 at an intermediate point in the operating temperature range of the latter. The resistance of resistor 12 may be adjusted, if desired, to change the temperature setting of the control circuit. Any of resistors 13, 14, and 15 may, of course, be used to provide the same adjustment capability and resistor 12 eliminated. Thermistor 11 would then have substantially the same resistance as resistors 13, 14, and 15.

A transistor differential amplifier has its input terminals connected to opposite ends of the other diagonal of the four-terminal bridge shown in FIG. 1. Transistors 17 and 18 are a matched pair of n-p-n transistors and have their emitter electrodes connected through a common biasing resistor 19 to ground. The base electrode of transistor 17 is connected to the bridge terminal formed by the junction between resistors 12 and 13, and that of transistor 18 is connected to the bridge terminal formed by the junction between resistors 14 and 15. The collector electrodes of transistors 17 and 18 are the output terminals of the differential amplifier and present relatively large transistor collector impedances.

The output terminals of the differential amplifier in FIG. 1 are connected directly to timing control terminals of an astable or free-running transistor multivibrator. This multivibrator includes a pair of p-n-p transistors 22 and 23.

As illustrated, the collector electrode of differential amplifier transistor 17 is connected directly to the base electrode of multivibrator transistor 22 and the collector electrode of differential amplifier transistor 18 is connected directly to the base electrode of multivibrator transistor 23. Current limiting resistors 24 and 25 are connected from the collector electrodes of respective transistors 22 and 23 to ground, and the emitter electrodes of transistors 22 and 23 are returned through a common diode to the positive side of voltage source 16. As shown, diode 26 is poled for easy current flow in the direction from source 16 toward transistors 22 and 23. Timing capacitors 27 and 28 complete the multivibrator, with capacitor 27 providing cross-coupling between the collector electrode of transistor 22 and the base electrode of transistor 23 and capacitor 28 providing similar cross-coupling between the collector electrode of transistor 23 and the base electrode of transistor 22. As illustrated, transistor 23 forms the output side of the multivibrator.

The remainder of the oven temperature control circuit in FIG. 1 constitutes the actual heating current supply circuit. A resistor 31 couples the collector electrode of multivibrator output transistor 23 to the base electrode of an n-p-n amplifying transistor 32. A load resistor 33 is connected from the collector electrode of transistor 32 to the positive side of a heating power source 34, and a current limiting resistor 35 is returned from the emitter electrode of transistor 32 to ground. Finally, the emitter electrode of transistor 32 is connected directly to the base electrode of the actual n-p-n heating current supply transistor 36, the oven heating element 37 is connected from the collector electrode of transistor 36 to the positive side of heating power source 34, and the emitter electrode of transistor 36 is returned through a current limiting resistor 38 to ground.

In the illustrated embodiment of the invention, input bridge thermistor 11 and heating element 37 are typically enclosed within the oven they are intended to control. If a change in oven temperature causes the resistance of thermistor 11 to change, the bridge becomes unbalanced and a potential difference appears across the diagonal between the junction of resistors 12 and 13 and the junction of resistors 14 and 15. The transistor differential amplifier then acts as a current steering circuit, increasing the current flowing from the multivibrator into the collector electrode of one of transistors 17 and 18 and decreasing that flowing into the other. The astable or free-running multivibrator in FIG. 1 is conventional except that its timing is controlled from the thermistor bridge by way of the transistor differential amplifier. Timing capacitors 27 and 28 discharge into the relatively high collector impedances of differential amplifier transistors 17 and 18.

In the operation of the illustrated embodiment of the invention, the duty cycle, i.e., the percentage of the operating cycle during which the transistor is conducting, of each side of the multivibrator is changed when temperature variations unbalance the bridge. When the resistance of thermistor 11, which typically has a negative temperature coefficient of resistance, drops because of a rise in temperature, the collector current drawn by transistor 17 decreases and that drawn by transistor 18 increases. Timing capacitor 27 in the multivibrator thus discharges more quickly and timing capacitor 28 discharges more slowly, causing the duty cycle of transistor 22 to increase and that of transistor 23 to decrease. When the resistance of thermistor 11 rises because of a drop in temperature, the action is just the opposite. The collector current drawn by transistor 17 then increases and that drawn by transistor 18 decreases. Timing capacitor 27 in the multivibrator discharges more slowly and the timing capacitor 28 discharges more rapidly, causing the duty cycle of transistor 22 to decrease and that of transistor 23 to increase.

As illustrated in FIG. 1, the output from the multivibrator is taken from the collector electrode of transistor 23. When multivibrator output transistor 23 conducts, the output voltage rises to a value approaching the voltage of positive voltage source 16 and, when transistor 23 is nonconducting, that voltage drops to substantially zero. The output voltage at the collector electrode of transistor 23 is thus a substantially square wave the duty cycle of which varies inversely with the temperature of thermistor 11. The output waveform is applied through coupling resistor 31 to the base-emitter path of transistor 32. Transistor 32, which is an emitter follower, acts as a non-inverting power amplifier and supplies the same waveform to the base-emitter path of heating current supply transistor 36. When the output voltage from the multivibrator is high, transistor 36 receives a strong forward bias across its emitter-base path which causes transistor 36 to saturate and its emitter-collector path to switch into a very low impedance state. When the output voltage from the multivibrator is low, the forward bias on transistor 36 is eliminated or sharply reduced and its emitter-collector path switches back into a high impedance state. The duty cycle of heating current supply transistor 36 is thus varied in the same manner as that of multivibrator output transistor 23.

The average heating current flowing in heating element 37 in the embodiment of the invention shown in FIG. 1 varies directly with the duty cycle of heating current supply transistor 36 and provides a nearly linear relationship between oven temperature and heater power. Thermal delay in heating element 37 provides an averaging effect which effectively smooths the on-off pattern of the heating current. Increases in the duty cycle increase oven temperature and decreases in the duty cycle have the opposite effect.

Figure 2:
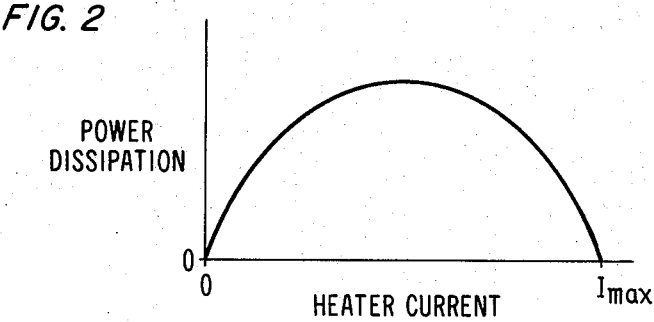
FIG. 2 is a curve showing the manner in which power dissipation in the heating current supply transistor varies with the amount of heating current supplied.

The manner in which power dissipation in the internal emitter-collector path of heating current supply transistor 36 in FIG. 1 varies with the amount of heater current flowing is illustrated in FIG. 2. As shown, dissipation is zero when no heater current is flowing. Although the internal emitter-collector path of the transistor then has relatively high resistance, no power is dissipated because no current flows. As current begins to flow through the emitter-collector path of transistor 36, power is dissipated within the transistor. The amount of power dissipation increases as current increases, reaches a maximum, and then decreases as the transistor approaches saturation. When the transistor reaches saturation, the internal resistance of its emitter-collector path is very low and, even though the current is maximum, the power dissipation again approaches zero. The present invention takes advantage of this characteristic feature of transistors by switching the emitter-collector path of transistor 36 back and forth between the two substantially zero power dissipation points on the curve. As a result, power dissipation in heating current supply transistor 36 remains low at all times and the desired improvement in circuit reliability is achieved.

Another important advantage afforded by the embodiment of the invention illustrated in FIG. 1 is a very low noise sensitivity at extreme duty cycles. Multivibrator timing capacitors 27 and 28 discharge directly into the collector electrodes of differential amplifier transistors 18 and 17, respectively. Because the collector impedances of transistors 17 and 18 are large, timing capacitors 27 and 28 discharge on curves which are substantially linear. At any point in time, whichever one of timing capacitors 27 and 28 is discharging retains more charge than it would if it were discharging along a curve which approached asymptotically the level at which the multivibrator triggers and reverses state. For this reason, small power supply disturbances, which may appear as noise, are less likely to cause premature triggering and reversal of state within the multivibrator and the duty cycles of both sides are less likely to be disturbed.

Because heating element 37 in FIG. 1 is normally located within the oven being controlled in close physical proximity to critical communication system components, there is always a possibility that sharp switching transients in heating current supply transistor 36 may be coupled, through inductive or capacitive cross-talk, into such components as noise. If that occurs, the noise may be eliminated with but little loss in heating current supply transistor reliability by providing a slight slope to the leading and trailing edges of each heating current pulse. This slope or ramp may be provided by connecting a small capacitor to ground from the base electrode of transistor 32 and by connecting a resistor in parallel with the capacitor. There is a slight increase in power dissipation in the emitter-collector path of heating current supply transistor 36 as a result but, as long as the slope is confined to a small fraction of each heating current pulse, any adverse effect upon circuit reliability is minor.

Finally, it is advantageous that power transistors 32 and 36 and differential amplifier transistors 17 and 18 are all of the n-p-n variety. In the present state of transistor fabrication art, n-p-n power transistors are somewhat easier to manufacture than p-n-p power transistors, and n-p-n transistors are easier than p-n-p transistors to manufacture in matched pairs. It should be understood, though, that the invention is in no way limited to any particular transistor conductivity type and that the illustrated embodiment is entirely operative with transistors of opposite conductivity type substituted for those shown as long as the polarities of all power sources and diodes are also reversed.

Figure 3:
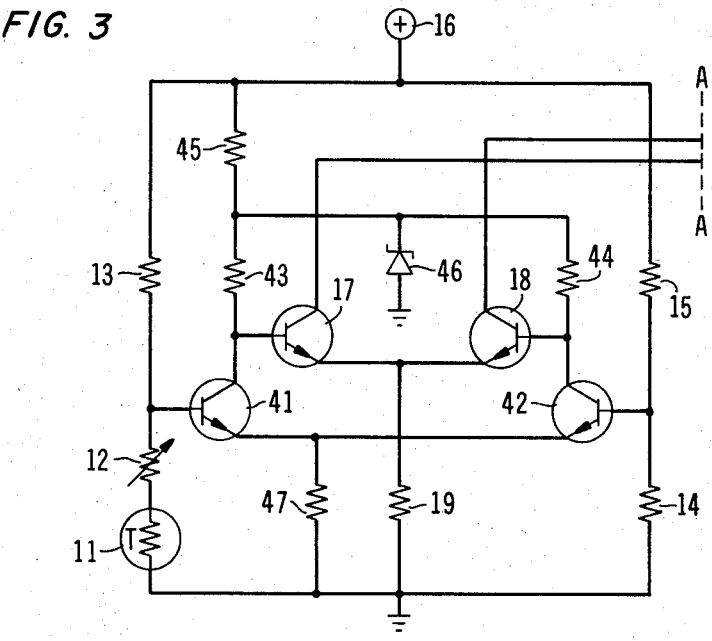
FIG. 3 is a schematic diagram of an alternative temperature variation detecting bridge suitable for use in the embodiment of the invention shown in FIG. 1 to provide still better temperature control precision.

An alternative temperature variation detecting bridge circuit which may be used in the embodiment of the invention illustrated in FIG. 1 to increase precision still further with no loss in reliability is shown in FIG. 3. There, the active bridge is the same as that shown in FIG. 1 except for the addition of another stage of differential amplification and connects to the remainder of the FIG. 1 circuitry along the line A—A.

In FIG. 3, a second matched pair of n-p-n transistors 41 and 42 form a second differential amplifier stage which drives transistors 17 and 18. As shown, the base electrode of transistor 41 is connected to the junction between bridge resistors 12 and 13 and the base electrode of transistor 42 is connected to that between bridge resistors 14 and 15. A pair of resistors 43 and 44 are connected from the respective collector electrodes of transistors 41 and 42 to a common point which is connected through a resistor 45 to the positive side of voltage source 16 and through a zener diode 46 to ground. Zener diode 46 is connected, as shown, with its forward direction of conduction from ground toward the common point between resistors 43 and 44. Resistor 45 and diode 46 shift the voltage level of the collector electrodes of transistors 41 and 42 to enable those transistors to function effectively with differential amplifier transistors 17 and 18. The emitter electrodes of transistors 41 and 42 are connected together and returned to ground through a common biasing resistor 47.

Because the second stage of differential gain shown in FIG. 3 provides a phase inversion, the connections from differential amplifier transistors 17 and 18 are reversed from those shown in FIG. 1. In FIG. 3, the collector electrode of transistor 17 is connected to the base electrode of multivibrator transistor 23, while that of transistor 18 is connected to that of multivibrator transistor 22.

What is claimed is:

1. A temperature control circuit which comprises means to detect departures of temperature from a predetermined value, a heating element, a transistor having its emitter-collector path connected to supply current from a first d-c power source to said heating element, an astable multivibrator having an output terminal and at least one timing control terminal, means coupling said detection means to said multivibrator timing control terminal to vary the duty cycle at said multivibrator output terminal, and means coupling said multivibrator output terminal to the base-emitter path of said transistor to switch the emitter-collector path of said transistor between substantially nonconducting and substantially saturated states, thereby supplying power from said first power source to said heating element and controlling the amount of heat generated thereby without substantial dissipation in the emitter-collector path of said transistor.

2. A temperature control circuit in accordance with claim 1 in which said detection means comprises a four-terminal resistance bridge having a temperature-sensitive resistance in one of its arms and a second d-c power source connected across one of its diagonals, said bridge detecting any departure of the resistance of said temperature-sensitive resistance from a predetermined value and translating it into a potential difference across the other of its diagonals.

3. A temperature control circuit in accordance with claim 2 in which said temperature-sensitive resistance is a thermistor.

4. A temperature control circuit which comprises a four-terminal resistance bridge having a thermistor in one of its arms and a first d-c power source connected across one of its diagonals, said bridge detecting any departure of the resistance of said thermistor from a predetermined value and translating it into a potential difference across the other of said diagonals, a differential amplifier having a pair of output terminals and having a pair of input terminals connected to opposite ends of said other of said bridge diagonals, an astable multivibrator having an output terminal and a pair of timing control terminals, said differential amplifier output terminals being connected to respective ones of said multivibrator timing control terminals to vary the duty cycle at said multivibrator output terminal under the control of said differential amplifier, a heating element, a transistor having its emitter-collector path connected to supply current form a second d-c power source to said heating element, and means coupling said multivibrator output terminal to the base-emitter path of said transistor to switch the emitter-collector path of said transistor between substantially nonconducting and substantially saturated states, thereby supplying power from said second source to said heating element and controlling the amount of heat generated thereby without substantial dissipation in the emitter-collector path of said transistor.

* * * * *